United States Patent
Barty

(10) Patent No.: US 6,804,045 B2
(45) Date of Patent: Oct. 12, 2004

(54) OPTICAL CHIRPED BEAM AMPLIFICATION AND PROPAGATION

(75) Inventor: Christopher P. J. Barty, Hayward, CA (US)

(73) Assignee: The Regents of the University of California, Oakland, CA (US)

(*) Notice: Subject to any disclaimer, the term of this patent is extended or adjusted under 35 U.S.C. 154(b) by 115 days.

(21) Appl. No.: 10/155,751

(22) Filed: May 24, 2002

(65) Prior Publication Data

US 2003/0218795 A1 Nov. 27, 2003

(51) Int. Cl.[7] .......................... H01S 3/00; H04B 10/00

(52) U.S. Cl. ....................... 359/337; 398/160

(58) Field of Search .......................... 398/160; 359/337, 359/333

(56) References Cited

U.S. PATENT DOCUMENTS

| | | | |
|---|---|---|---|
| 4,723,247 A | * | 2/1988 | Bhowmik et al. ............. 372/2 |
| 5,235,606 A | | 8/1993 | Mourou et al. ............... 372/25 |
| 5,329,398 A | | 7/1994 | Lai et al. ..................... 359/566 |
| 5,847,863 A | | 12/1998 | Galvanauskas et al. ..... 359/341 |
| 5,960,016 A | | 9/1999 | Perry et al. .................. 372/25 |
| 6,081,543 A | | 6/2000 | Liu et al. ..................... 372/102 |
| 6,272,156 B1 | * | 8/2001 | Reed et al. ................... 372/25 |
| 6,603,600 B2 | * | 8/2003 | Pang ........................... 359/348 |
| 2003/0189756 A1 | * | 10/2003 | Erbert et al. ................ 359/572 |

* cited by examiner

Primary Examiner—Nelson Moskowitz
Assistant Examiner—Deandra M. Hughes
(74) Attorney, Agent, or Firm—Michael C. Staggs; Alan H. Thompson

(57) ABSTRACT

A short pulse laser system uses dispersive optics in a chirped-beam amplification architecture to produce high peak power pulses and high peak intensities without the potential for intensity dependent damage to downstream optical components after amplification.

44 Claims, 2 Drawing Sheets

Replacement Sheet

OPTICAL CHIRPED BEAM AMPLIFICATION AND PROPAGATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention provides ultra-intense laser pulses capable of interacting with matter, and more specifically, it relates to a system and a method of lengthening a pulse's duration by distributing its spectral content in space prior to or after amplification to produce a high power, short pulse. The distribution of the spectral content in space results in a chirped beam.

2. Description of Related Art

The conventional method for circumventing optical damage due to amplification of high intensity pulsed sources is accomplished by chirped-pulse amplification (i.e., CPA).

Chirped pulse amplification had its origin during microwave radar development more than 50 years ago. In the optical case, one avoids intensity dependent damage by increasing the input temporal pulse duration prior to amplification by passing an input pulse through a frequency dependent delay line. A chirped pulse in time is produced wherein the instantaneous frequency varies linearly as a function of time. A CPA system typically includes a pulse source and an optical pulse stretcher and compressor comprised of diffraction gratings to manipulate the frequency components of a received ultra-short pulse. In the pulse-stretching phase, components manipulate the optical frequencies of a received ultra-short pulse to form a temporal duration that can be amplified by a laser gain medium without initiating optically induced damage that would otherwise occur if the temporal properties of the pulse were left unchanged. Normally, after reaching a desired amplification, a compressor (i.e., conventionally a pair of parallel diffraction gratings) reverses the optical paths of the frequency components to reproduce the original temporal duration of the input pulse source.

SUMMARY OF THE INVENTION

Accordingly, the present invention provides a short pulse laser system that uses dispersive optics in a chirped-beam amplification system to produce high peak power pulses without the potential for intensity dependent damage to an amplifier or final optics after amplification.

Another aspect of the present invention provides a short pulse laser system that uses dispersive optics in a chirped-beam amplification system to produce high peak power pulses without the potential for intensity dependent damage to an amplifier or final optics after amplification or wherein the dispersive optics in a chirped-beam amplification system are adapted to receive amplified temporally chirped pulses prior to producing a chirped beam to enable high peak power pulses without the potential for intensity dependent damage to an amplifier or final optics.

The present invention incorporates a laser source having an output bandwidth capable of generating high power pulses using the technique of chirped-beam amplification. The present invention includes a pair of diffraction gratings that disperses one or more positive temporally chirped pulses from a lasing source and collimates the spectral content of the dispersed pulse(s) to produce a chirped i beam. An amplifying laser material having a gain bandwidth and a saturation fluence necessary to amplify the bandwidth of the laser source is positioned after the diffraction gratings to amplify the chirped beam to a predetermined energy. A refractive or reflective optic then focuses the amplified chirped beam to a rapidly longitudinally varying temporal and intensity confocal region to produce a high-energy pulse of short duration.

A method of the present invention includes the steps of producing optically chirped pulses having a predetermined spectral content, dispersing the pulses by utilizing dispersive optics to spread the spectral content of the chirped pulses spatially, collimating the spectral content to produce pulses having long local temporal durations in a chirped beam, wherein the ratio of input and output beam dimensions produces a predetermined spatial chirp ratio, between about 2 and about 100, amplifying the output beam received from the final dispersive optic, and compressing the amplified beam in time and space.

An additional method aspect provides for "Chirped Pulse Juxtaposed with Beam Amplification," wherein a chirped pulse amplification (CPA) design precedes a chirped beam amplification (CBA) arrangement to further extend the local pulse duration to provide high peak powers.

Accordingly, the present chirped-beam amplification apparatus and method provides for an efficient, cost effective arrangement, capable of high peak powers (an intensity greater than $10^{12}$ Watts, with pulse-widths less than 2.5 ps). The present system and method is useful for ultra-high precision laser machining, ultra-high resolution multiphoton microscopy, and the system's increased longitudinal intensity localization can play a role in new pondermotive particle acceleration schemes.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

General Description

Figure 1:
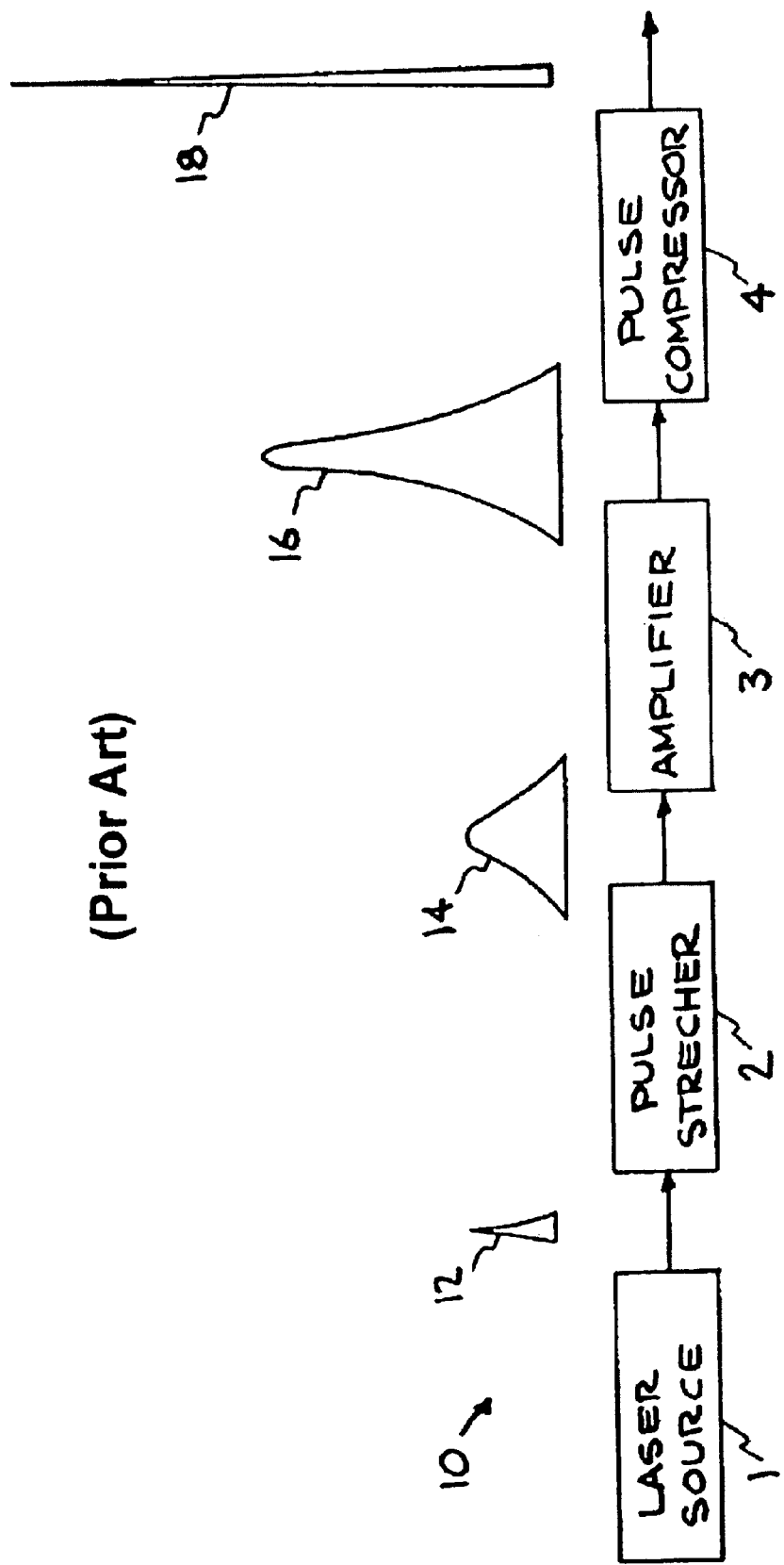
FIG. 1 illustrates a conventional method of chirped-pulse amplification.

Intensity dependent optical damage is a common problem with respect to conventional short pulse amplification systems. FIG. 1 illustrates a conventional high peak power (i.e., chirped-pulse amplification (CPA)) architecture. The overall system 10 contains a laser source 1 having a pulse(s) 12 with a predetermined short temporal pulse duration; a pulse stretcher 2 to increase the pulse to a predetermined stretched temporal duration 14; typically, a pre-amplifier (not shown) and a power amplifier 3 constructed to receive and to produce an amplified stretched pulse(s) 16; and a pulse compressor 4 to compress an amplified stretched pulse 14 to an amplified temporally short pulse 18.

Lasing source 1 is typically a commercially available oscillator or any laser material and mode-locking mechanism capable of producing pulses of the desired duration and bandwidth. Pulse stretcher 2 is conventionally an optical dispersive component such as a reflective or transmissive grating (not shown), that produces a stretched pulse 14 from laser source 1 to decrease the peak power intensity of each individually stretched pulse, (i.e., peak power is inversely proportional to the temporal duration of each individual pulse), prior to amplification. Amplifier 3 then receives and amplifies stretched pulse 14 to produce stretched amplified stretched pulses 16. Prior to output from a conventional high peak power (CPA) system 10, stretched amplified output pulses 16 from amplifier 3 are directed to pulse Such a structure and method of operation for pulse stretching and compressing with gratings thereof is disclosed in incorporated by reference Co-pending, Co-filed U.S. application Ser. No. 10/117,744, titled "Short Pulse Laser Stretcher-Compressor Using A Single Common Reflective Grating" by Erbert et al., the disclosure is herein incorporated by reference in its entirety. Pulse compressor 4 is typically an optical dispersive component such as a reflective or transmissive grating that compresses the amplified stretched pulse back to a desired temporal pulse-width prior to being directed to a predetermined application.

Pulse stretching in conventional high peak power CPA architectures prior to amplification is necessary to avoid damaging the laser amplifiers by an intense pulse (e.g., femtosecond and picosecond laser pulses with sufficient energy). A dispersive optical device as shown as pulse stretcher 2 in FIG. 1, is a device in which the time required to traverse the device is a function of the frequency of the light. This is most commonly achieved by devices in which the optical path length is a function of frequency. Examples include propagation through a fiber, wherein the variation in optical path length, L with frequency, $\omega$, is given by the frequency dependence of the refractive index, $n(\omega)$, i.e., $L_{opt} = n(\omega) L_{fiber}$. Much higher dispersion can be achieved with pulse stretchers employing a reflective or a transmission diffraction grating wherein the different frequency components of the laser pulse travel physically different paths determined by the angular dispersion of the diffraction grating, $m\lambda = \sin(\theta_{in}) + \sin(\theta_{out})$, where $\lambda$ is the wavelength of the laser light and $\theta_{in}$ and $\theta_{out}$ are the input and output angles from the diffraction grating, respectively.

Stretched pulse(s) 14 from pulse stretcher 2 is typically first received by a pre-amplifier (not shown) to be amplified by one or more orders of magnitude, with a preferred amplification of at least about six orders of magnitude, (an order of magnitude being a multiplication of 10), to about a millijoule or more. Following amplification from a conventional preamplifier (not shown), pulses are typically serially directed to amplifier 3 (i.e., a power amplifier), for further amplification of the pre-amplified stretched pulse(s) in order to reach predetermined operating energy levels.

In conventional (CPA) designs, compressor 4, typically comprises one or more diffraction gratings (not shown) arranged to receive an input spatial profile (i.e., a spatial cross section), of amplified stretched pulse(s) 16. An exemplary round trip of a grating pair (not shown) reconstructs the temporal profile of amplified temporally stretched pulse 16 substantially back to its original temporal pulse duration to produce an amplified temporally short pulse 18 by overlapping all dispersed frequencies in time, i.e., so that the input temporal pulse chirp is removed. The electric field envelope at this point in space is a short pulse.

Amplified temporally short pulse 18, typically less than 2.5 picoseconds, enables operators to perform desired experiments or applications. However, pulse compressor 4 of the conventional high intensity CPA system suffers from the problem of the pulse intensity being largest at an exemplary final grating (not shown) of pulse compressor 4. This large intensity is because the local electric field envelope at this point is a short pulse that results in intensities greater than the practical damage threshold (i.e., greater than $10^{12}$ w/cm$^2$) for pulse compressor 4 and subsequent optics (not shown).

Figure 2:
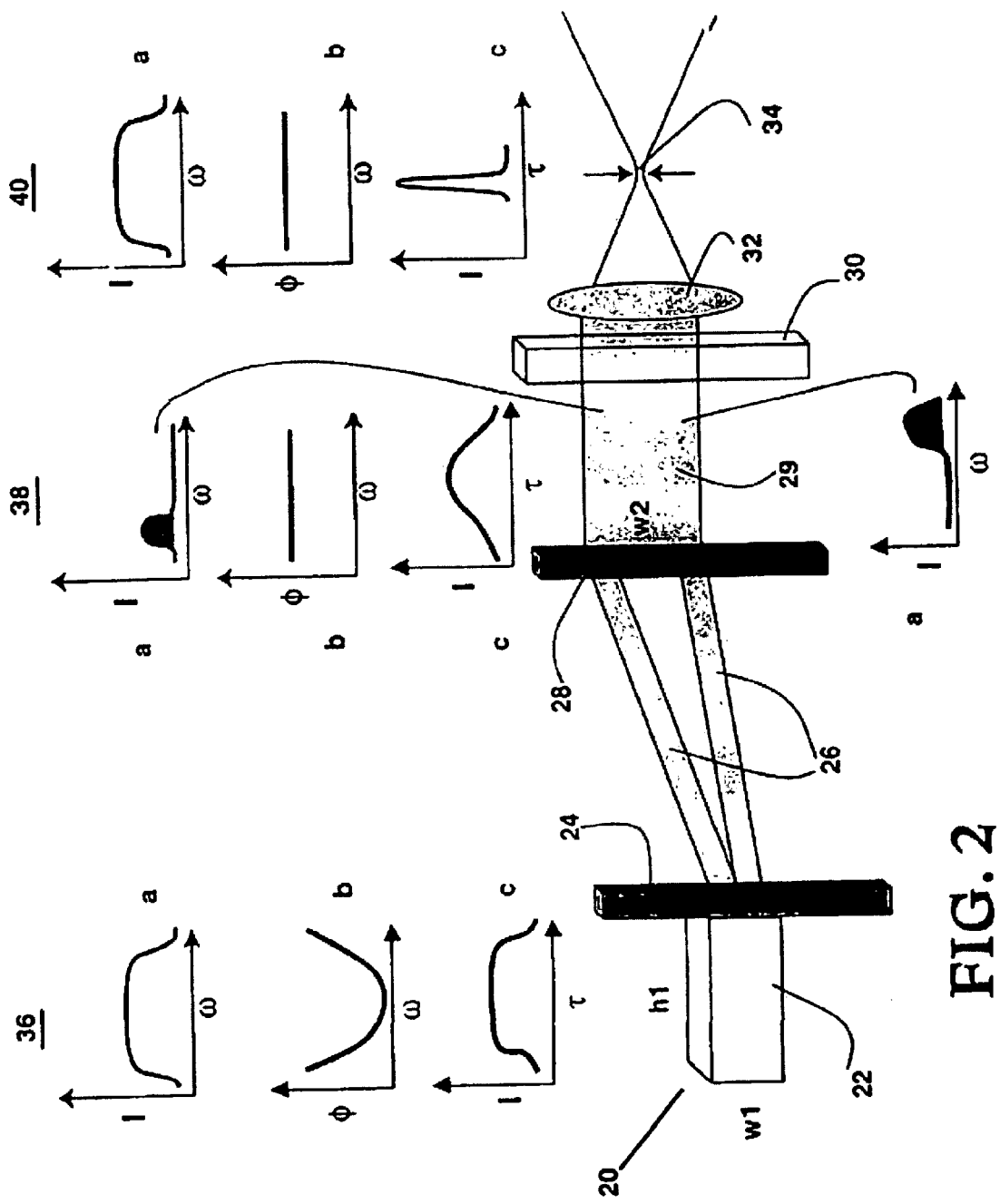
FIG. 2 shows the chirped-beam apparatus of the present invention.

FIG. 2 represents a chirped-beam amplification (CBA) system 20 of the present system. An input pulse(s) (not shown) having a beam profile 22 (w1,h1) from a lasing source (not shown) with a predetermined bandwidth (i.e., a frequency content from an exemplary pulsed laser source), is incident upon one or more diffraction components 24, such as one or more reflective or transmissive gratings, or any dispersive component capable of spatially dispersing a spectral content from a pulsed source. A dispersed spectral content 26 are received by one or more optical diffractive components 28, such as a transmission or reflective grating, or any dispersive optical component(s) arranged to substantially collimate a spectral content 29 received from dispersed spectral content 26.

An amplifying material 30 is arranged to receive and amplify input pulse(s) before or after the spectral content of input pulses (not shown) are dispersed and recollimated by one or more diffraction components 24 and 28 respectively. An optical compressor 32 focuses spectral content 29 to a focus 34 to produce a short pulse duration with a high intensity.

Specific Description

A preferred laser source (not shown) employed in the present invention for system 20 in FIG. 2, is typically a 10 MHz up to a 100 MHz repetition rate mode-locked oscillator that operates with multiple longitudinal modes capable of generating ultra-short pulses (i.e., an ultrashort pulse is one having a duration in the range of 5 femtoseconds to 50 picoseconds) with even lower repetition rates selected from the aforementioned higher repetition rates by conventional active or passive optical means.

The laser source (not shown) provides a wavelength range between 200 and 2000 nm, preferably about 1053 nm, having an average power output of at least 10 mw and a bandwidth up to 150 nm, preferably greater than about 2 nm. However, lasing source mediums such as excimer lasers capable of meeting design parameters of the present invention or any laser material and mode-locking mechanism capable of producing pulses of the desired duration, wavelength and bandwidth can be employed. Exemplary laser materials include Neodymium(Nd)-doped glass, Neodymium-doped yttrium lithium fluoride, Yb:YAG, Ti:Sapphire, Yb:glass, KGW, KYW, YLF, S-FAP, YALO, YCOB, GdCOB, Cr:forsterite, and Ce:LiCAF or other broad bandwidth solid-state materials that are capable of meeting the designed parameters of the present invention.

One or more pulses of the present invention having a preferred input beam profile 22 (e.g., having a height h1 to width w1 ratio from about unity to about 10 to 1) is serially directed from the lasing source (not shown). The individually received pulses from the (not shown), each comprise a total spectral content 36(a) locally, having a quadratic phase with respect to a frequency 36(b), with a group velocity dispersion 36(c) that is preferably positive. Positive group velocity dispersion (i.e., a positive chirped pulse) is an approximately instantaneous linear sweep of the frequency with respect to time so that the red components (i.e., longer wavelengths) precede the blue components (i.e., lower frequencies). The temporally chirped pulsed output can be produced by conventional methods available in the art of chirped pulse amplification such as by but not limited to diffraction pair gratings, fiber Bragg gratings or single mode fibers to produce chirped pulses from the lasing source (not shown).

Input beam profile 22 of the present invention is received by diffraction component 24, such as a reflective diffraction grating or a holographic transmission diffraction grating, (i.e., a periodical structure produced by interference of optical beams in a photosensitive medium with the periodical structure embedded in the volume of the optical component to permit transmission through the medium), preferably a multi-layer dielectric transmission diffraction grating having dimensions between about 0.1 meter X 0.2 meter and about 0.5 meter X 1 meter. The structure and method of preparation of multi layer dielectric diffraction gratings thereof is disclosed in U.S. Pat. No. 5,907,436, the disclosure is herein incorporated by reference in its entirety. However, any dispersive optical component capable of performing the function of spatially dispersing spectral content 26 either in one or two dimensions having a predetermined input spatial profile 22 received from a lasing source (not shown) as required by the present invention may be employed.

Diffraction component 28, such as a reflective or transmission grating, preferably a multi-layer dielectric transmission grating, receives and substantially collimates spectral content 26 and is arranged to have a separation from an optical diffraction component 24 such that dispersion introduced by diffraction component 24 causes width w1 in a one-dimensional chirped-beam amplification system, of input beam profile 22 to be expanded, for example by (n) times its original dimension. Diffraction component 28 causes spectral content 29 having a width w2 to be temporally unchirped but with a spatially varying frequency content 38(a) (i.e., a spatially chirped beam), a spectral phase 38(b) that can be, but is not limited to a frequency (ω) independent spectral phase, (i.e., a transform limited pulse), and a temporal duration 38(c) that is long at a predetermined local spatial coordinate because an individual frequency content locally (i.e., at a predetermined local spatial coordinate), in space is essentially a continuous wave subset of frequencies which does not transform into a short pulse. The area of the beam in this example is increased by a factor of w2/w1 and thus the intensity is decreased by a factor of w1/w2. More importantly, spectral content 29 of the beam at any given position in space is reduced by the ratio of the input beam width, (w1,22) to the output beam width, (w2, 29). Therefore, the local pulse duration 38(c) at any position in space is longer based on input (w1,22) and output (w2,29) ratios in an exemplary one-dimensional chirped beam amplification system than the transform limit of the input bandwidth of a given pulse from a laser source (not shown). The intensity is thus reduced another factor of (w1/w2). A useful technique at this point is to insert a cylindrical telescope to reproduce input beam profile 22 dimensions (w1,h), to retain the spatially chirped characteristics but with local spectral content 38(c) still at (w1/w2) of input beam profile 22.

A preferred one-dimensional chirped-beam amplification system 20 thus includes an input beam profile 22 having a width w1, 22 and height (h, 22) wherein width (w1,22) is diffracted to a width (w2,29) with a ratio (w2/w1) from about 2 to about 100, preferably 40. In a two dimensional chirped-beam amplification system (i.e., 2-dimensional spatial chirp), exemplary one or more diffraction components 24, 28 are simultaneously adapted to carry out the same operation as discussed above in a transverse spatial direction to produce a pulse (n times) even longer in duration than a one-dimensional chirped beam system based on an additional transverse chirp ratio from about 2 to about 100, preferably about 40. Furthermore, an exemplary two dimensional chirped-beam amplification system is adapted to produce a collimated annular distribution of spectral content 26 either as a radial position on the spatial profile or as a position on an exemplary circular spatial profile. Such a two-dimensional system further produces a pulse longer in duration locally based on an area at diffraction grating 28 over an area at input beam profile 22 from about 1000 to about 100,000, enabling atmospheric propagation of a short pulse over large distances (i.e., from about 1 meter to hundreds of kilometers). In principle, one can further extend the local pulse duration by Chirped Pulse Juxtaposed with Beam Amplification (CPJBA). CPJBA comprises chirping in time as described herein before using chirped pulse amplification architecture (CPA) in addition to chirped beam amplification (CBA) architecture. An input pulse (not shown) having a predetermined temporal duration is thus temporally stretched using CPA, amplified by amplifier 30, and then chirped spatially and compressed by system 20 and the method described herein before. Such an exemplary system is important for high-saturation-fluence laser materials (e.g., Yb:silicate) which require long temporal pulse stretching for efficient energy extraction.

Amplifying material 30, preferably arranged after diffraction components 24 and 28 so as not to be constrained by intensity dependent damage on input to diffraction component 24, provides a predetermined amplification of the peak power (i.e., the power per individual pulse divided by the temporal duration), of received collimated spectral content 29. Amplification of an input pulse(s) (not shown) is from about $10^3$ to about $10^8$, and may include multiple stages (e.g., one or more preamplifiers) and preferably utilizes Neodymium-doped Glass (i.e., Nd:Glass) as amplifying material 30. Nd:Glass is the optimum choice among several suitable lasing materials because the material has the properties of a long upper state storage time, a suitable wavelength of absorption to enable direct diode pumping, and sufficient gain bandwidth to support the amplification with minimal spectral narrowing of the pulse. However, laser amplifying mediums such as excimer lasers capable of meeting design parameters of the present invention or any lasing material with sufficient spectral bandwidth, a long upper state storage lifetime, and that can also be directly diode, laser or flash-lamp pumped may be used. Exemplary laser materials are Chromium-doped $LiSrAlF_6$ (and related compounds, e.g., Cr:LiSrGaAlF), Neodymium(Nd)-doped glass, and Neodymium-doped yttrium lithium fluoride, Ti:Sapphire, Yb:YAG, Yb:glass, KGW, KYW, YLF, S-FAP, YALO, YCOB, GdCOB, Cr:forsterite, and Ce:LiCAF.

An optical focusing element 32, such as a parabolic mirror or a refractive positive lens, receives the amplified, collimated, spatially dispersed spectral content and is adapted to form one or more beam spots 34 that comprise high intensity pulses capable of performing a variety of applications. Focusing element 32 is designed to have low chromatic aberration (i.e., chromatic aberration being the longitudinal variation of focus (or image position) with wavelength). Such a design, for example by introducing a refractive achromat (e.g., a lens comprising two sections of different material dispersion) corrects for various wavelength dependent focal positions and provides overlap of the spectral content at a resultant focus in space and time to produce a short duration optical pulse 34. Focusing element 32 thus acts as a compressing element. Optical pulse 34 within a confocal region (i.e., the distance within a focal region of a lens or mirror where a beam is substantially collimated before the beam begins to diverge significantly) thus comprises a total spectral content locally 40(*a*) having a phase independent of frequency (i.e., transform limited) 40(*b*) with a short temporal duration 40(*c*) that is the result of overlapping in time and space. The resultant confocal region of focusing element 32 provides a rapidly varying longitudinal pulse duration and a rapidly varying longitudinal intensity with a tilted (due to overlap of the localized frequencies of spectral content 29) spatial profile as the beam traverses through the confocal region. A plasma mirror (not shown) such as a flat or curved reflector may be arranged to receive the tilted profile (not shown) and direct a resultant plasma emission from plasma mirror (not shown) to a designed target (not shown).

A useful application of this increase in longitudinal variation allows increased localization along the direction of propagation for femtosecond ($10^{-15}$) micromachining. In solids between about $10^{13}$ and about $10^{15}$ W/cm$^2$, a plasma forms, light is absorbed, and material is damaged. First, the free electrons are generated by single or multiphoton absorption. They are then multiplied to reach the critical density where the plasma can absorb the laser energy due to the great number of collisions to finally damage the material. This single or multiphoton absorption is a deterministic process wherein the increased longitudinal variation of the present invention can be utilized to ablate materials in a controlled fashion.

The present invention is also useful for femtosecond multiphoton microscopy, (i.e., molecular excitation in a material by simultaneous absorption of two or more photons), because longer wavelengths (near IR) of system 20 produce less photodamage when adapted to excite molecules that are typically excited in the UV range between about 200 and about 400 nm. The longitudinal intensity variation through the confocal region of focus 34 can thus be used to provide spatial image resolution in three dimensions because two and three photon induced fluorescence mechanisms are intensity dependent. In addition, the transverse intensity distribution of the chirped beam of tilted focus 34 in a one-dimensional chirped beam system 20 provides rapid scanning in the transverse direction. If system 20 is adapted to produce a two-dimensional linearly spatially chirped beam, a resultant tilted plane within confocal region 34 of compressor 32 further reduces three-dimensional scanning within a volume of a selected material.

System 20 is also useful in new mediated particle acceleration schemes (i.e., intense electric fields creating electron density gradients) due to its increased longitudinal intensity per area (i.e., between about $10^{16}$W/cm$^2$ and about $10^{15}$W/cm$^2$) localization which provides x-ray production generation and relativistic nonlinear optics applications.

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

What is claimed is:

1. An apparatus, comprising:
   a source of one or more temporally chirped pulses,
   at least one dispersive optic adapted to receive, frequency disperse and collimate a spectral content of said chirped pulses at predetermined local spatial coordinates to produce a chirped beam,
   an amplifier constructed to receive and amplify said chirped beam; and
   an optical means arranged to receive and optically compress in time and space said amplified chirped beam.

2. The apparatus of claim 1, wherein said dispersive optic comprises a first and a second reflective diffraction grating.

3. The apparatus of claim 2, wherein said first and said second grating further comprise a multilayer dielectric reflection diffraction grating.

4. The apparatus of claim 3, wherein said first reflective diffraction grating is adapted to disperse a spectral content of said chirped pulses and wherein said second reflective diffraction grating is adapted to receive said dispersed spectral content at a selected angle of incidence and a predetermined separation distance from said first reflective grating to produce one or more transform limited pulses of long temporal duration in a chirped beam at predetermined local spatial coordinates in one dimension, wherein a local spectral content is reduced by the ratio of an input beam width at said first reflective diffraction grating to a collimated beam width at said second diffraction grating to provide a spatial chirp ratio between about 2 and about 100.

5. The apparatus of claim 1, wherein said dispersive optic further comprises one or more reflective diffraction gratings adapted to disperse a spectral content of said chirped pulses and designed to receive said dispersed spectral content at a selected angle of incidence to produce one or more collimated, transform limited pulses of long temporal duration in a chirped beam in two dimensions, wherein said local spectral content is reduced by the ratio of an input beam area to an output beam area at said second reflective diffraction grating to provide a spatial chirp ratio between about 1000 and about 100,000.

6. The apparatus of claim 5, wherein a compressed pulse beam having a substantially annular frequency distribution with respect to the radius of said chirped beam is produced.

7. The apparatus of claim 5, wherein a compressed pulse beam having a substantially annular frequency distribution with respect to a position on said chirped beam is produced.

8. The apparatus of claim 1, wherein said dispersive optic comprises a first and a second transmission diffraction grating.

9. The apparatus of claim 8, wherein said first transmission diffraction grating is adapted to disperse a spectral content of said chirped pulses and wherein said second transmission diffraction grating is adapted to receive said dispersed spectral content at a selected angle of incidence and a predetermined separation distance from said first reflective grating to produce one or more transform limited pulses of long temporal duration in a chirped beam at predetermined local spatial coordinates in one dimension, wherein a local spectral content is reduced by the ratio of an input beam width at said first transmission diffraction grating to a beam width at said second transmission diffraction grating to provide a spatial chirp ratio between about 2 and about 100.

10. The apparatus of claim 1, wherein said dispersive optic further comprises one or more transmissive diffraction gratings adapted to disperse a spectral content of said chirped pulses and designed to receive said dispersed spectral content at a selected angle of incidence to produce one or more collimated, transform limited pulses of long temporal duration in a chirped beam in two dimensions, wherein a local spectral content is reduced by the ratio of an input beam area to an output beam area at one or more final collimating diffraction gratings to provide a spatial chirp ratio between about 1000 and about 100,000.

11. The apparatus of claim 10, wherein a compressed pulse beam having an annular frequency distribution with respect to the radius of said beam is produced.

12. The apparatus of claim 10, wherein a compressed pulse beam having an annular frequency distribution with respect to a position of said beam is produced.

13. The apparatus of claim 1, wherein said optical means for compressing further comprises a focusing optic to produce a short duration optical pulse.

14. The apparatus of claim 13, wherein said focusing optic produces a substantially tilted line focus having an intensity greater than $10^{12}$ Watts.

15. The apparatus of claim 13, wherein said focusing optic is transmissive.

16. The apparatus of claim 15 wherein said focusing optic is an achromat capable of minimizing chromatic aberration.

17. The apparatus of claim 13, wherein said focusing optic is reflective.

18. The apparatus of claim 17, wherein said focusing optic is a parabolic reflector.

19. The apparatus of claim 1, wherein said source comprises a lasing material selected from Erbium, Neodymium (Nd)-doped glass, Neodymium-doped yttrium lithium fluoride, Yb:YAG, Ti:Sapphire, Yb:glass, KGW, KYW, YLF, S-FAP, YALO, YCOB, Cr:forsterite, and GdCOB.

20. The apparatus of claim 1, wherein said source comprises an excimer laser.

21. The apparatus of claim 1, wherein said amplifier comprises a lasing material selected from Neodymium(Nd)-doped glass, Neodymium-doped yttrium lithium fluoride, Yb:YAG, Ti:Sapphire, Yb:glass, KGW, KYW, YLF, S-FAP, YALO, YCOB, Cr:forsterite and GdCOB.

22. The apparatus of claim 1, wherein said dispersive optic is further adapted to receive amplified temporally chirped pulses from said amplifier with a predetermined bandwidth such that said amplified pulses having a spectral content are frequency dispersed and collimated locally in space.

23. An apparatus, comprising:
a source of one or more temporally chirped pulses,
at least one dispersive optic adapted to receive said chirped pulses, frequency disperse and collimate a spectral content of said chirped pulses at predetermined local spatial coordinates to produce a chirped beam, wherein an amplifier having a predetermined bandwidth is constructed to receive and amplify said chirped beam and wherein said dispersive optic is further adapted to receive amplified temporally chirped pulses from said amplifier and adapted to produce an amplified chirped beam; and
an optical means arranged to receive and optically compress said chirped beam in time and space.

24. An apparatus, comprising:
a source of temporally chirped pulses,
a first diffraction grating adapted to serially receive and to disperse to predetermined local spatial coordinates, a spectral content of said chirped pulses in one dimension,
a second diffraction grating adapted to serially receive and collimate said dispersed pulses from said first diffraction grating to produce a chirped beam, wherein a local spatial spectral content is reduced by the ratio of a predetermined input beam dimension at an input to said first diffraction grating to a designed beam dimension at an output of said second diffraction grating,
a Nd:Glass amplifier, constructed to serially receive said collimated pulses from said second diffraction grating to produce amplified transform limited pulses; and
an optical means for focusing said amplified pulses received from said second diffraction grating, wherein said pulses overlap in space and time at a focus.

25. The apparatus of claim 24, wherein said optical means for compressing further comprises a focusing optic to produce a short duration optical pulse.

26. The apparatus of claim 25, wherein said focusing optic produces a substantially tilted line focus that rapidly varies in intensity and in pulse duration longitudinally in a predetermined confocal region having an intensity greater than $10^{12}$ Watts at $10^{53}$ nm.

27. The apparatus of claim 24, wherein said source comprises a lasing material selected from Erbium, Neodymium(Nd)-doped glass, Neodymium-doped yttrium lithium fluoride, Yb:YAG, Ti:Sapphire, Yb:glass, KGW, KYW, YLF, S-FAP, YALO, YCOB, Cr:forsterite, and GdCOB.

28. The apparatus of claim 24, wherein said source of laser pulses comprises an excimer laser.

29. A method of producing an ultra-high peak power pulse, comprising:
producing one or more temporally chirped pulses from a lasing source having a spectral content,
dispersing said spectral content of said chirped pulses in one dimension to predetermined local spatial coordinates,
collimating at said predetermined local spatial coordinates said locally dispersed spectral content to produce transform-limited pulses of long local temporal duration in a chirped beam having a chirp ratio between about 2 and about 100,
amplifying said transform limited pulses in a solid-state amplifying media; and
compressing in time and space said transform-limited pulses.

30. The method of claim 29, wherein said lasing source comprises a lasing material selected from Erbium, Neodymium(Nd)-doped glass, Neodymium-doped yttrium lithium fluoride, Yb:YAG, Ti:Sapphire, Yb:glass, KGW, KYW, YLF, S-FAP, YALO, YCOB, Cr:forsterite, and GdCOB.

31. The method of claim 29, wherein said lasing source further comprises an excimer laser.

32. The method of claim 29, wherein said amplifying media is a lasing material selected from Neodymium(Nd)-doped glass, Neodymium-doped yttrium lithium fluoride, Yb:YAG, Ti:Sapphire, Yb:glass, KGW, KYW, YLF, S-FAP, YALO, YCOB, Cr:forsterite, and GdCOB.

33. The method of claim 29, wherein said amplifying media further comprises an excimer laser.

34. The method of claim 29, wherein said compressed amplified pulses have a pulse duration from about 0.05 to less than about 10 picoseconds, a bandwidth between about 1.5 and about 70 nm, and wherein a compressed laser pulse has an intensity greater than $10^{12}$ Watts, and a wavelength in the range from about 200 to about 2000 nm.

35. The method of claim 29, wherein each said compressed amplified pulse has an intensity greater than $10^{12}$ Watts, and an operating wavelength of 1053 nm.

36. The method of claim 29, wherein said step of compressing further comprises an optical device focusing said amplified transform limited pulse to a substantially tilted line focus that rapidly varies in intensity and in pulse duration longitudinally in a predetermined confocal region, wherein a plasma mirror is adapted to receive said focusing pulse and produce a plasma to illuminate a target as said tilted line focus moves through said region.

37. The method of claim 36, wherein said plasma mirror is flat.

38. The method of claim 36, wherein said plasma mirror is curved.

39. The method of claim 29, wherein said step of dispersing further comprises the steps of dispersing said spectral content of said pulses in two dimensions to predetermined local spatial coordinates; and collimating said dispersed pulses to produce one or more transform limited pulses each having a long local temporal duration in a chirped beam in two dimensions, wherein a local spectral content is reduced by the ratio of an input beam area to an output beam to provide a chirp ratio between about 1000 and about 100,000.

40. The method of claim 39, wherein said chirped beam has an annular frequency distribution with respect to the radius of said chirped beam to provide atmospheric propagation over large distances from about 1 meter to about hundreds of kilometers.

41. The method of claim 39, wherein said chirped beam has an annular frequency distribution with respect to a position of said chirped beam to provide atmospheric propagation over large distances from about 1 meter to about hundreds of kilometers.

42. A method of producing an ultra-high peak power pulse, comprising:

producing one or more positive temporally chirped pulses from a lasing source having a spectral content, amplifying said positive temporally chirped pulses in a solid-state amplifying media, dispersing said amplified chirped pulses in one dimension to predetermined local spatial coordinates, collimating said locally dispersed spectral content to produce one or more transform-limited pulses having a long local temporal duration in a chirped beam having a chirp ratio between about 2 and about 100; and compressing in time and space said chirped beam.

43. The method of claim 41, wherein said dispersing step further comprises the steps of dispersing said spectral content of said pulses in two dimensions to predetermined local spatial coordinates; and collimating said dispersed pulses to produce one or more transform limited pulses each having a long local temporal duration in a chirped beam in two dimensions, wherein a local spectral content is reduced by the ratio of an input beam area to an output beam area to provide a chirp ratio between about 1000 and about 100,000.

44. A method comprising:

producing one or more pulses from a lasing source having a spectral content and a predetermined pulse width, linearly chirping in time said spectral content to produce one or more temporally stretched pulses to be amplified, amplifying said one or more temporally stretched pulses in an amplifying medium, dispersing said amplified chirped pulses in one or more dimensions to predetermined local spatial coordinates, collimating said locally dispersed spectral content to produce one or more transform-limited pulses having a long local temporal duration in a chirped beam; and compressing in time and space said chirped beam.

* * * * *